United States Patent

King

[11] 4,050,180
[45] Sept. 27, 1977

[54] DOWNRIGGER REEL AND TEMPERATURE INDICATOR

[76] Inventor: Jack C. King, 678 Massachusetts Ave., North Muskegon, Mich. 49445

[21] Appl. No.: 713,116

[22] Filed: Aug. 10, 1976

[51] Int. Cl.² .......................................... A01K 89/00
[52] U.S. Cl. ........................................ 43/27.4; 43/4; 242/106
[58] Field of Search ...................... 43/27.4, 4; 242/106

[56] References Cited

U.S. PATENT DOCUMENTS

| | | | |
|---|---|---|---|
| 3,031,788 | 5/1962 | Shannon | 43/4 |
| 3,628,274 | 12/1971 | Wojahn | 43/4 X |
| 3,785,079 | 1/1974 | Rohn | 43/4 |
| 3,808,731 | 5/1974 | Lowrance | 43/4 |
| 3,844,058 | 10/1974 | King | 43/27.4 |
| 3,916,555 | 11/1975 | Booth et al. | 43/27.4 |

Primary Examiner—Russell R. Kinsey
Assistant Examiner—Daniel J. Leach
Attorney, Agent, or Firm—Miller, Morriss and Pappas

[57] ABSTRACT

An improved temperature and depth indicating downrigger reel in which the reel drum provides a nest between the spokes for thermal electronic indicator apparatus and in which the cable forms the conductor element to a thermal sensor element adjacent the end thereof. A calibrated gage supported in a two-piece housing provides electrometric read-out from between the spokes of the cable carrying drum and one end of the cable is attached to the gage. Power for operation of the thermometric read-out gage is contained in the drum in the two-piece case and at or adjacent the gage. A friction wedge lock is provided which acts between the flanges of the drum to selectively limit pay out of cable. Simultaneous depth read-out is provided by a counter indicator showing the amount of cable payed out and being an indicator of depth. Continuous read-out of temperatures is provided.

9 Claims, 16 Drawing Figures

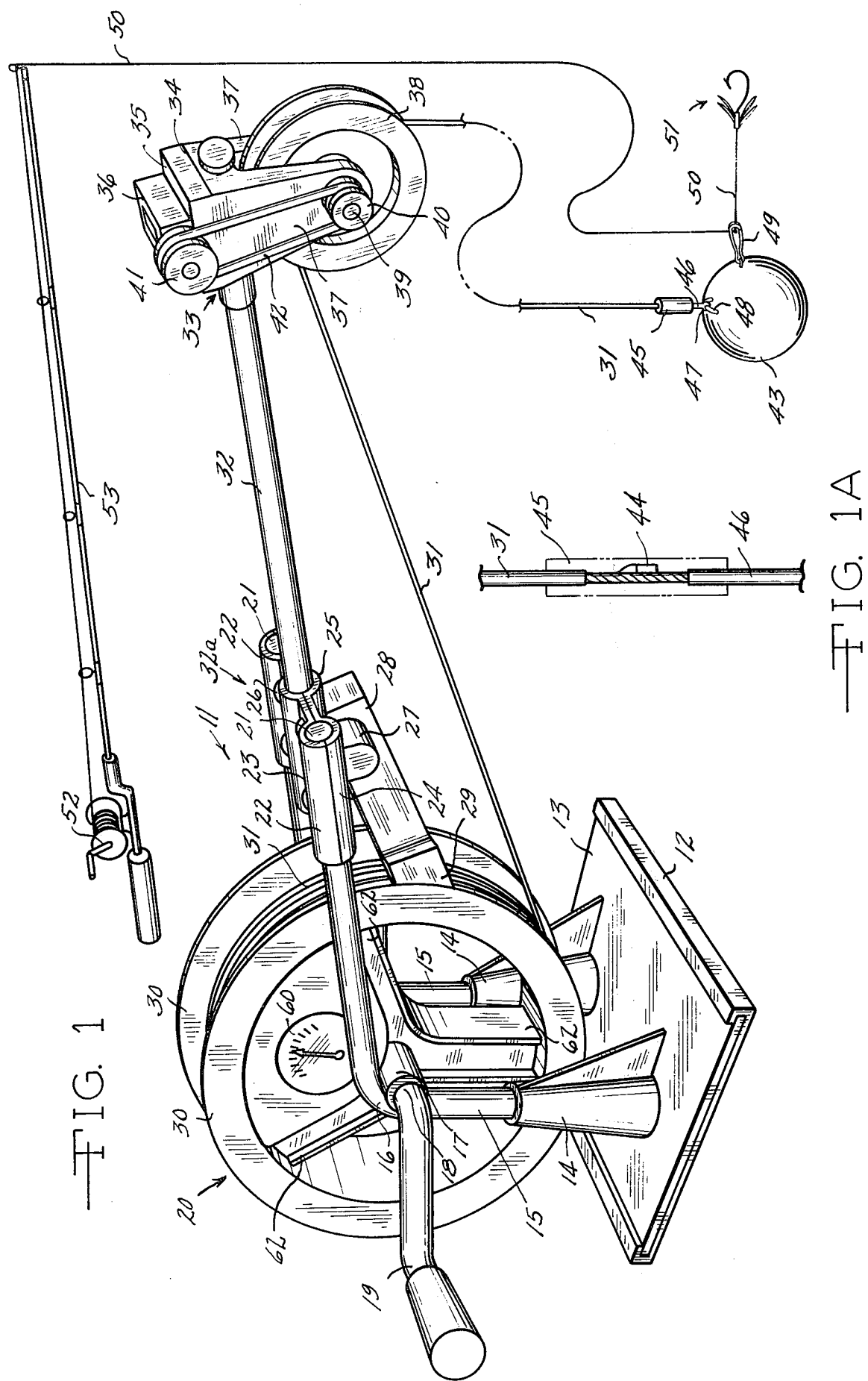

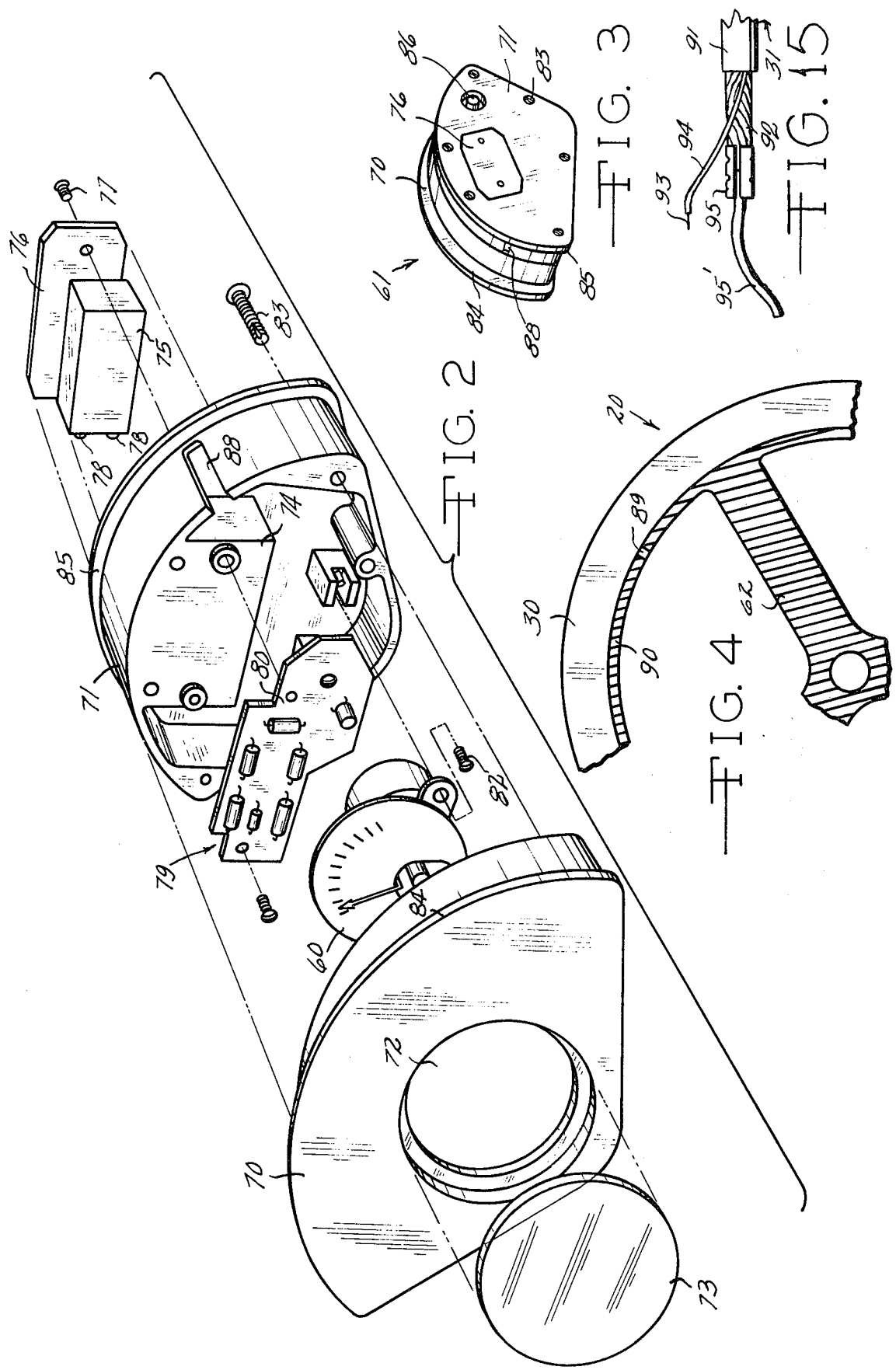

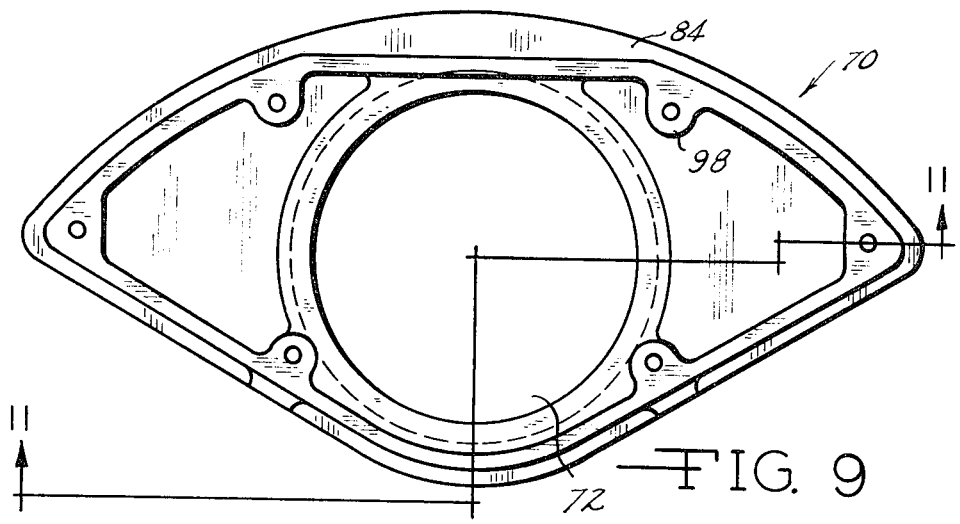
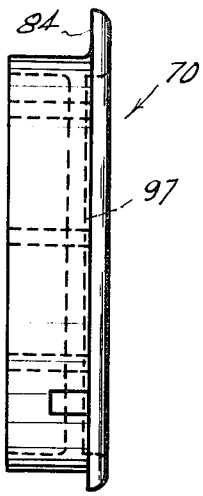
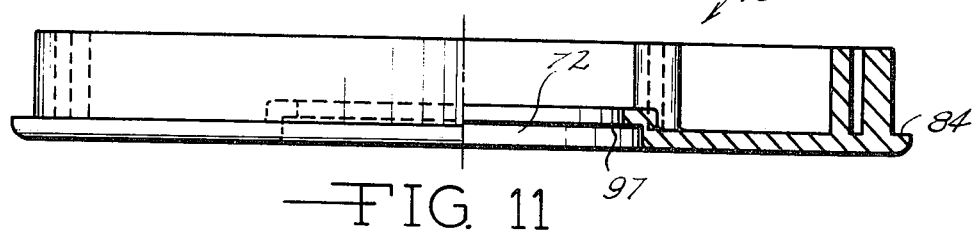
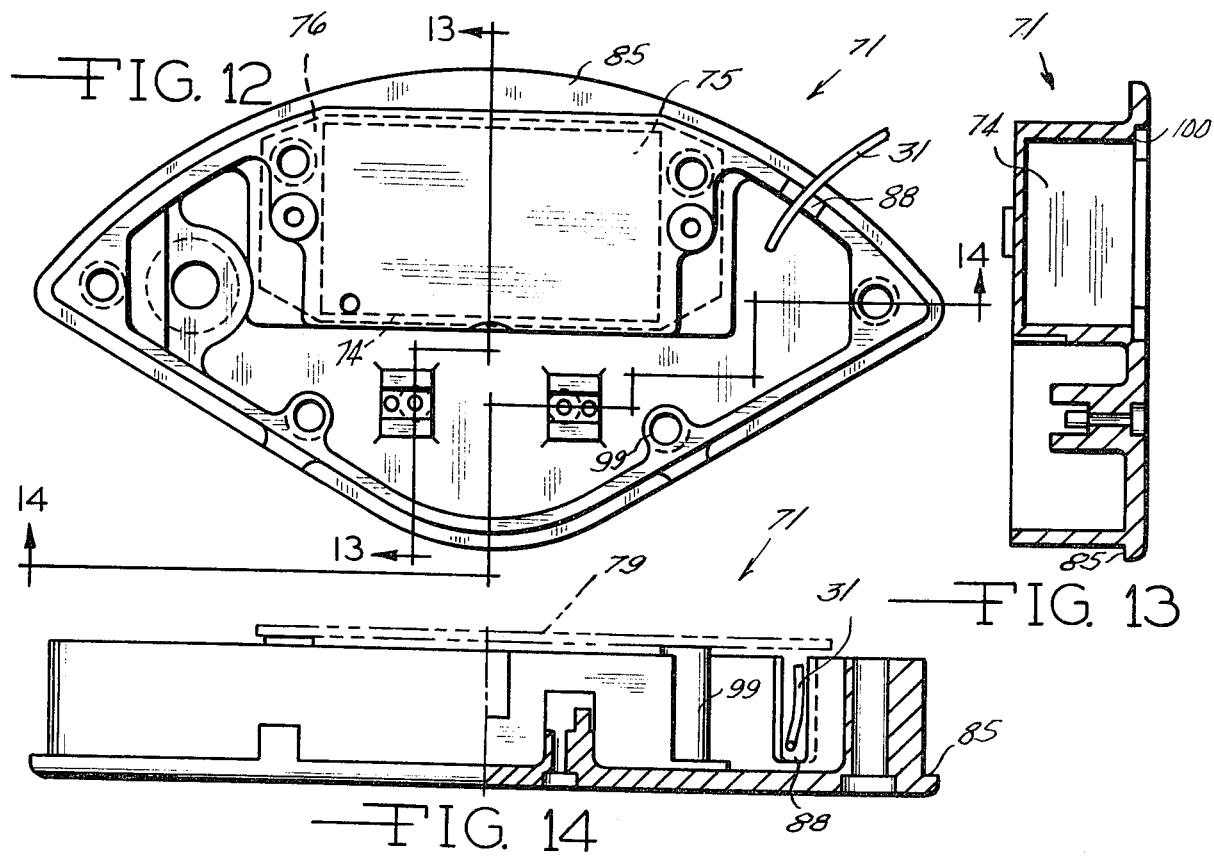

DOWNRIGGER REEL AND TEMPERATURE INDICATOR

The present invention is a new and improved thermometric readout downrigger reel for fishing which is self powered (as opposed to using electric power generated by the boat engines) and which uses a single plural stranded cable with an interwoven copper insulated strand as the conductor structure and which avoids completely the necessity or advisability of slip rings. This is achieved by nesting the gage structure in the drum between the spokes and coupling the gage to the read-out end of the conductor cable having the interwoven isolated copper strand. In fishing use the cable is connected to a weight in a conventional manner and a thermistor is terminally connected to the cable above the connection with the weight so that the remotely read temperature condition is of the water at the approximate trolling depth at selected trolling speed. Factors influencing actual depth include the amount of weight, the speed of the trolling vessel and water current in respect to trolling direction.

In deep trolling a rather substantial reel called a "downrigger reel" is provided and is usually attached to the fishing boat to control the selected lowering and lifting of a trolling weight. The trolling weight, dependent on boat and current speed, is suspended from a cable and the cable is wound up on or lowered from the drum or reel. The actuation of the reel may be manual as by winding handles or the reel may be power activated electrically, hydraulically or pneumatically, as desired. Two variables are required in order to maximize the employment of a downrigger. One should know the apparent depth of water (by amount of cable released) and the temperature of the water at that depth. Both pieces of information are readily available in the downrigger reel structure herein described.

PRIOR ART DISCUSSION

In my U.S. Pat. No. 3,844,058 a downrigger reel filling all of the requirements except thermal read-out and friction braking is described. In the present structure, the improvements comprise the integration of a thermometric circuit, read-out gage, and cable coupling. The cable is a standard plural component structure in which one strand is a copper wire coated over its entire length with a thin but durable insulation so that only a single cable is wound on the drum. The other strands of the cable are load bearing strands. The load bearing portion of the cable provides one lead and the single insulated strand in the cable provides the other lead.

Aside from my own patent, the prior art is represented well by considering remote control thermocouples generally and the devices used in boreholes such as seen in the U.S. Pat. No. 2,316,942 to Henri-Georges Doll and the newer high speed thermometers as shown by the U.S. Pat. No. 2,818,482 to Frank K. Bennett. In these devices a thermally sensitive resistor (sometimes called a thermistor) is utilized in an electric circuit usually as one resistance leg in a Wheatstone Bridge and an electrometric gage (for example, a galvanometer) or ammeter is calibrated to indicate in the circuit the change in resistance in the temperature sensitive thermistor element and the change in resistance is relayed directly to the temperature at the thermistor. Thus, electrometric read-out has provided simple means for remotely obtaining a temperature reading where the thermally sensitive element is remotely located. In general, in all of the early remote sensing devices, two electric leads run from the read-out gage and circuit to and return from the thermistor. These remote sensing concepts received expression in the fishing field by the inclusion of thermometric means located "at the lure" in U.S. Pat. No. 3,031,788 to Melvin L. Shannon. The device of Shannon included slip-rings attached to the shaft of a fishing reel so as to allow read-out from the electrical leads embodied in the fishing line and extending to the lure. A thermistor was provided on the terminal end of the fishing line and was coupled by leader to the lure. This construction was objectionable because the tackle (fishing line) was generally stiff and a special fishing line was required and described. In the U.S. Pat. No. 3,628,274 to Charles P. Wojahn the prior art was extended to downriggers or weight lines dropped from a boat and to which the tackle or fishing line was separately connected until a strike or other disengagement of the lure. Theoretically, the Wojahn structure provided a thermal readout at lure depth. Actually the read-out was at the weight. The invention was directed to the ballast or weight structure. The disclosure in Wojahn includes a downrigger reel with the indicating system within the reel and with the two conducting wires woven into the cable.

OBJECTS OF THE INVENTION

As will be seen, the present invention is directed to a new and inventive combination of open spoked and friction braked drum and between the spokes of which drum is inserted a read-out structure in an especially compact and transistorized arrangement and in which there is provided special cable in which the load bearing strands of the cable provide one of two conductors. This, as will be appreciated, results in a single apparent cable coupled to the thermistor and in turn connected to the weight and in avoidance of slip rings and strained connections at the drum end of the cable. The cable provides stainless steel, Monel metal, or load carrying strands of other material as one electrical lead and a single interwoven and insulated copper wire provides the other electrical lead.

Accordingly, one of the objects of the present invention is to provide a new and improved downrigger reel by nesting thermal indicating apparatus between the spokes of the drum, for continuous read-out.

Another object is to provide a downrigger reel structure having temperature read-out without slip-rings and a reel in which available depth read-out or cable pay out is available.

Another object is to provide a downrigger reel in which the drum is selectively stopped by a friction brake operating as a wedge between the flanges of the drum.

Still another object is to provide a downrigger termperature readout structure having an integrated cable and conductor combination so that cable stress does not interfere with read-out for function and the stainless steel cable strands are easily connected to the electronic and read-out components.

Other objects include the provision of compact, self powered read-out means for depth and temperature which are economical and simple to construct and maintain and which are durable under stress of heavy fishing conditions.

Still other objects will be appreciated by those skilled in the art as the description proceeds.

GENERAL DESCRIPTION

In general, the present invention is a downrigger reel having remote temperature sensing capabilities and in which the thermal read-out apparatus is nested between the spokes of the drum and is directly coupled to the load carrying strands of the cable and to an isolated conductive strand of highly conductive material contained in the complete integrated cable structure. The reel as used for downrigger fishing is detachably mounted to a deck plate and the deck plate may be secured to a boat or rail thereof. Stanchions which are a part of the base support a pair of rod-like arms and the arms extend vertically and are bent forwardly in spaced parallel relation to a connection with a socketed connector. The same connector incudes a socket into which is secured a center rod extension. The connector also provides a connection means for keeping the friction brake in depending relation until needed. On the outer end of the rod is a swivel rotatable on the axis of the rod and being bifurcated and forming depending legs. The legs support a sheave or pulley on a shaft. The shaft is connected by a resilient belt member to a counter structure riding on top of the swivel.

The rod-like arms have, attached at the bends as by welding, a pair of spaced-apart aligned sleeves or bearings. A handled crank is supported in the bearings and the handles are shaft extensions which support the spoked reel or drum operable between the spaced-apart arms. The drum contains cable and the cable is utilized as a conductor and is connected at one end to the temperature indicator and circuit between the spokes of the drum. The other end of the cable is operably connected to a thermistor or temperature sensitive resistor. One of the strands of the cable is isolated from the load carrying strands of the cable and provides the second conductor between thermistor and read-out gage and circuit. The thermistor allows the load bearing strands to extend and form a coupler allowing the cable to be selectively secured to a suitable weight or cannonball in avoidance of direct strain at the thermistor connection. The cannonball includes slip connector means allowing the fishing line with the lure to be clamped thereon. Release of the fishing line occurs when a fish takes the lure and jerks or slips the line from the slip connector. When a snag of the lure occurs a similar result obtains. The socketed connector which supports the outboard ends of the rodarms and the central rod extension includes a pivoted lever. The lever has a wedge-like end which fits between the flanges of the drum in a jamming manner. The length of the lever exceeds the distance between the brake pivot and the drum periphery. By pivoting the lever into wedging engagement with the drum during paying out of cable, the drum is easily and smoothly braked while providing a limited degree of slip. Rewind frees the brake by relief of the frictional jamming. The temperature condition at the approximate lure depth is ascertainable by read-out on the gage measuring resistance of the thermistor or other related electrometric indicia and the downrigger and the apparent length of cable and depth of the lure are both easily determinable by reading the counter provided on the end of the rod at the swivel. The swivel on the end of the rod supports the sheave over which the cable passes and provides a perfect directional shifting as the boat is turned so that the cable is subjected to minimal strain and (barring slack in the weight line) prevents the cable from jumping off the sleave or pulley. This also allows a deeper groove pulley to be used which assists in prevention of the cable from leaving the pulley. The continuous read-out can be turned on and left on while fishing to provide a continuous temperature monitor.

In operation the present downrigger reel is a distinct improvement over prior reels and provides unique electrical conduction to the thermistor and exploits an electronic circuit using minimum power so that small power DC batteries are adequate for use over relatively long periods of usage. The use of the temperature gage is selective and is activated only as required but provides continuous read-out until switched off. The friction brake allows controlled slippage in prevention of damage to the drum or loss of line and weight in hang-up situations. by reason of utilizing the load carrying cable strands as one of the conductors, the single copper strand is more fully protected against differential stressing. Chafing disconnections and strain damage to the circuit as occurred in earlier known movable thermal sensing devices is avoided.

IN THE DRAWINGS

FIG. 1 is a perspective view of the spoke drum downrigger reel of the present invention in which a temperature gage is provided nested between two of the spokes and a depth read-out is provided at the rod end and a fishing reel, rod and tackle are separately used but where the line to the lure is connected releasably to the downrigger weight.

FIG. 1A is an enlarged view of the thermistor capsule connected to the cable and conductor adjacent the cable connection to the weight and protected from damage by the resin encapsulating capsule.

FIG. 2 is an exploded perspective view of the read-out structure and circuit board as it is assembled in its housing and to sandwich the reel therebetween and located between a pair of adjacent reel spokes.

FIG. 3 is a perspective assembled view from the side of the thermometric read-out structure opposite the gage face and showing the battery insertion panel and the read-out push button on-off switch.

FIG. 4 is a partial elevation view through the reel and cut away to indicate the location of connector leads through the drum for access to the electronic printed circuit board.

FIG. 9 is a top plan view of the gage face side of the case.

FIG. 10 is an end elevation view of the gage face side of the case seen in FIG. 9.

FIG. 11 is a front elevation view sectioned on the line 11—11 of FIG. 9 to indicate the internal construction of the gate face side of the case.

FIG. 12 is the mating opposite half of the case of FIG. 9 and indicating input leads and battery cavity.

FIG. 13 is a side elevation view of FIG. 12 and cut away on the line 13—13 of FIG. 12 to clarify the battery cavity.

FIG. 14 is a front elevation view of the structure of FIG. 12 cut away on the section lines 14—14 of FIG. 12 to show the lead slots.

Figure 6:
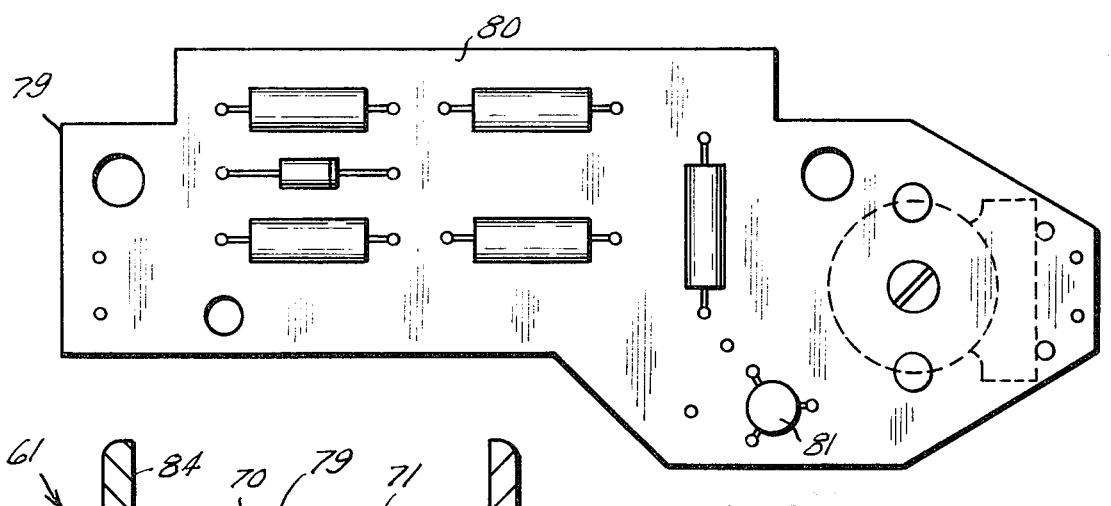
FIG. 6 is a top plan view of the printed circuit boards.

FIG. 15 indicates the cable construction at the lead connection end to the printed circuit and indicating the manner in which the stainless steel or load conducting strands are crimped to a copper lead at the end to facilitate a solder connection at the circuit board.

SPECIFIC DESCRIPTION

Referring to the drawings and first to the FIG. 1 thereof, a full appreciation of the use setting of the downrigger reel 11 is best appreciated. The downrigger reel structure 11 is secured to the vessel or boat by insertion in the connector channel 12 as shown. The channel 12 is selectively fastened as by screws or bolts to the boat. The base 13 which is held by the channel 12 includes a pair of spaced-apart stanchions 14 which are socketed to receive the rod frame elements 15. The rod frame elements 15 rise from the stanchions 14 vertically in spaced interval and then bend at bends 16 outwardly and upwardly as shown. Nested in the bends 16 and welded there are a pair of aligned sleeve bearings 17. The sleeve bearings 17 support the shaft 18 which is a horizontal extension of the crank arms 19 which extend on both sides of the downrigger reel and are keyed or fixed to the drum 20 and form the axis of the drum 20. This provides a two-handled crank for operation of the drum 20. When the drum 20 is powered the shaft 18 is drivably and reversably connected to a transmission and power source. The forward ends 21 of the rod frame elements 15 are secured in fixed relation within sleeves 22 formed by the clamping together of the two shell elements 23 and 24 to form a connector. Together the shell elements 23 and 24 define two sleeves and control parallel sleeve 25. The two shells 23 and 24 are clamped together as by fasteners 26 and the shell 24 includes a depending clevis portion 27 which pivotally supports the lever-like brake arm 28 so that the wedged end portion 29 can be frictionally engaged with the drum 20 between the flanges 30 thereof and in an over-center manner the wedge blocks further withdrawal of cable 31 therefrom. A calculated slippage prevents absolute jamming since the flanges 30, under overstress, allow slippage. The cable 31, as will be seen, comprises an outer resin insulating coat, a group of load bearing metal strands, and a single insulated piece of wire stranded with the cable strands. A rod arm 32 is supported in the central sleeve 25 of the sandwich-like frame connector 32a formed by elements 23 and 24. The arm 32 extends to suit requirements of stiffness or resiliency to the swivel 33 which is positioned on the extended end of the rod arm 32 and is axially rotatable thereon. A clevis portion 34 of the swivel 33 provides a platform mounting 35 for the counter 36 and the arms 37 of the clevis portion 34 operably support the sheave or pulley 38 on shaft 39. A pair of drive pulleys 40 and 41 are interconnected by a spring band or belt 42. The pulley 40 turns with the sheave 38 and by means of the band 42 drives the pulley 41 and thence the counter 36. By adjusting and calibrating sheave 38 and pulleys 40 and 41 appropriate lineal read-out is possible at the counter 36. The rigging is as shown in the FIG. 1 with the cable 31 paying off the drum 20 with counterclockwise action of the drum (as viewed) and then the cable 31 passes under and substantially parallel to the rod arm 32 and over the sheave 38 depended by the swivel 33 beneath the arm 32. This arrangement assures that severe turns of the boat will not tend to cause unusual wear on the sheave 38 and will prevent tendencies in the cable 31 of leaving the sheave 38 because the swivelling will follow the trailing cable 31 as the relative direction of the boat or vessel changes. The cable 31 extends downwardly to a point above the connection to the weight 43 where the cable 31 is connected to a thermistor 44 at the load bearing strands and at the copper or high conductivity strand (see FIG. 1A). Then a resin sleeve or pot 45 is cast around thermistor so that the load bearing strands 46 of the cable 31 pass through the pot 45 and form a loop or eye 47 permitting easy attachment to the disconnect ring 48 of the weight 43. This isolates the resistance element 44 from the tension stresses in the load bearing strands and isolates the highly conductive strand from stress.

A tension release clip 49 is also operably connected to the weight 43 and the leader or fishing line 50 is selectively clipped into position to trail the lure or bait 51 as desired. The fishing line 50 runs up to the fishing reel 52 mounted on a fishing rod 53 held by the fisherman in the process of landing a fish. In downrigger fishing a "strike" by a fish results in the fishing line 50 being freed from the weight 43 and then playing and landing is accomplished via the fishing rod 53, reel 52 and line 50. The function of the weight 43 was to position the lure 51 at a selected level approximating the location of the weight. The weight 43 is then reeled back into the boat and a new connection of fishing line 50 is achieved.

The downrigger 11 is provided with a gage 60 in an instrument case 61 positioned between adjacent spokes 62 and within the thickness of the drum 30. As will be seen, the gage 60 provides an electrometric read-out of the thermal condition at the thermistor 44. The circuit structure is transistorized and miniaturized to require minimum weight and space and to require minimum electrical current. Small 9-volt transistor type DC batteries provide instantaneous service with long life in accordance with use. As will be seen, a closing of a simple push button on-off switch provides a direct continuous reading and selective disconnect for the DC power. The instrument case 61 is made in mating parts to sandwich the spokes 62 therebetween and so as to fit between the planes of the drum flanges 30.

The swivel 33, clevis parts 34, drum 20, connector 32, sheave 38, brake bar 28, instrument case 61 and handle grips on the handles 19 may be made of high impact non-corrosive and thermally durable resin such as "Delrin," a resin product of E. I. DuPont de Nemours and Company.

In FIG. 2 the compact construction of the instrument case 61 is best appreciated. The case 61 comprises a pair of mating flanged shells 70 and 71 that fit between the spokes 62 and the drum flanges 30. The gage side 70 of the case 61 includes a central opening 72 into which a sight glass or lens 73 is pressed so as to provide visual access to the electrometric readout gage 60 positioned in the opening 72. The battery side 71 of the case 61 provides a walled cavity 74 into which the battery 75 is positioned and fastened by means of the cover plate 76 and fasteners 77. The electrical poles 78 of the battery 75 make electrical contact on closing with suitable lead elements connected to the printed circuit 79 on circuit board 80 and in contact with the electronic components 81 and, on assembly, to the gage 60. The fasteners 82 and 83 close the assembly as seen in FIG. 3 and closure is achieved between the spokes 62 so that the flanges 84 and 85 grip and hold the case 61 against dislodgement. The operating button on-off switch 86 is visible in the FIG. 3 as is the cover 76 which closes in the batteries 75. The slot 88 provided in the case shell 71 allows the entry of the cable 31 into the case 61 and connection to the circuit. Corresponding opening 89 is provided through the cylindrical floor 90 of drum 20 (FIG. 4).

Since the connection of the cable 31, electrically to the circuit, is by stainless steel, Monel metal or like load bearing on one side and copper on the other, the advised procedure for connection is best seen in FIG. 15. The cable 31 is preferably coated with a smooth outer resin 91 which is pliant and durable. Inside the resin sheath 91 is the cluster of wound metal strands 92. One of these metal strands 93 is insulated or coated by coat 94 and is otherwise stranded with the other metal strands. The strand 93 is usually an excellent conductor such as an alloyed copper and it is very simply disengaged and soldered or otherwise connected to the circuit board. The stainless steel and/or Monel strands resist soldering or simple electrical connection and are therefore crimped into a brass ferrule 95 or sleeve with a copper wire extension 95' which is then easily provided with conventional connectors or is soldered in place in the circuit as desired. A similar connection may be employed at the thermistor 44.

Figure 5:
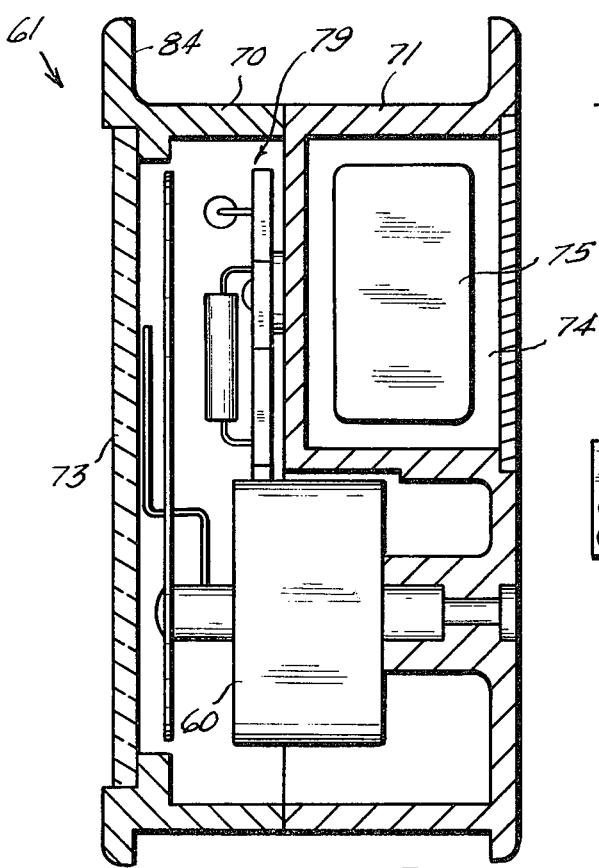
FIG. 5 is a section view through the read-out case and relating the suspension of the principal elements between the drum flanges and the spokes.

FIG. 5 is a full section view through the case 61 and showing the assembled relation of the flanged case elements 70 and 71 and the components of printed circuit 79, battery 75 and closure 76 and glass 73.

Figure 7:
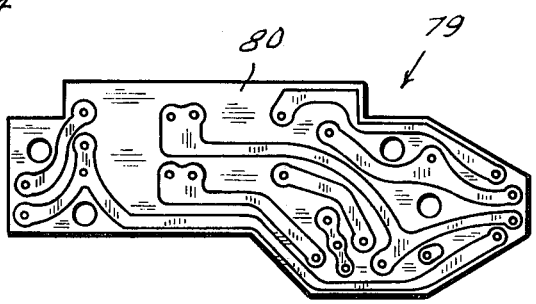
FIG. 7 is a top plan view of the printed circuit of FIG. 6 and indicating the conducting lines on the bottom face. This is oriented in the same sense as FIG. 6 for clarity and is necessarily somewhat schematic since it is not a bottom plan view, but a top plan view indicating the bottom portion as if the board was transparent.

FIG. 6 shows the printed circuit 79 insofar as it connects with electronic components 81. The actual board 80 is suitably pierced for the fasteners and for receiving the electronic components and lead connections as shown. FIG. 7 indicates the printed portion of the circuit board 79 and 80.

Figure 8:
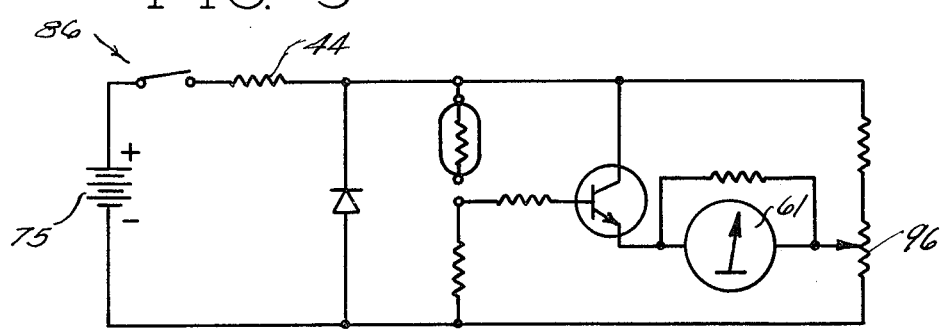
FIG. 8 is a schematic diagram of the electronic circuit.

In FIG. 8 is a somewhat schematic diagram of the electronic circuit in which the Wheatstone bridge analogy is obvious and the gage 61 is interposed as a visible electrometric read-out when the push button 86 activates the circuitry. The variable potentiometer 96 provides calibrating and trim means and the sensor resistance 44 is appreciated as remote from the read-out means.

FIGS. 9, 10 and 11 indicate the construction of the shell 70 on the gage side of the case 61. The single casting has the central opening 72, the perimeter flange 84 and the boss 97 against which the glass 73 is pressed. Means are provided in the form of posts 98, blind on the outer face, to accommodate self-tapping fasteners. Injection molded, this part is produced in mass quantities with high precision.

FIGS. 12, 13 and 14 show the construction of the mating and opposite shell 71 in which the printed circuit 79 and battery 75 are contained. The posts 99 are provided with through openings to accommodate fasteners 83 and the flush mounting of the closure 76 on the shoulder 100 is best appreciated. The opening 88 allows leading-in of the cable 31 radially from through the drum 20. Preferably shell 71 is operation injection molded too.

The downrigger element described provides improved downrigging performance and brings economical temperature sensing means to the fishing industry. By utilizing for the first time the load bearing cable elements for electromounting connection with a single interwoven conduction wire, a much more durable and lasting construction is provided which can stand the rigors of continuous and repetitive use in severe exposure to the weather elements and to shock strain. Available with the temperature is information reflecting the pay-out of cable and from which an approximation of relative depth can be made. Specific fastening means may include gasketing and sealing and a variety of construction details may be substituted in fastening and the like. While a manual drive unit has been illustrated, a power drive may also be integrated for raising and lowering the cable without departure from the spirit of this invention. New flexibility has been added in the wedge brake structure. The power source is self contained, is easily replaceable or renewed and is wholly independent of the power available in the boat or vessel.

Having thus described my invention, those skilled in the art will readily perceive modifications, changes and improvements and all such modifications, changes and improvements are intended to be included herein, limited only by the scope of my hereinafter appended claims.

I claim:

1. A downrigger structure for spoke wheeled downriggers comprising:
    a downrigger reel having spokes and flanges;
    a segment shaped two-piece case with flanges thereon; said case flanges engageable with the spokes and flange of said downrigger reel and said case nesting between adjacent spokes;
    an electronic circuit in said case;
    a battery inside said case and operably connected to said circuit;
    a selectively operable switch in said case selectively permitting flow of power to said circuit;
    a cable encased in an outer resin sheath and including plural unsheathed load bearing strands and one highly conductive copper strand which is resin coated, said cable operably connected at one end to said circuit;
    a thermal sensing element operably connected at the other end of said cable; and
    a calibrated gage connected to said circuit whereby conductometric variances proportional to thermal variances in said sensor give a proportional read-out of thermal conditions at said sensor.

2. A temperature and depth indicator downrigger structure comprising:
    a spoked drum selectively operable for rotation on its axis and having a radial opening therein:
    a cable wound on said drum and one end thereof extending through said radial opening in said drum, said cable including an outer resin coating, a plurality of strands of load bearing material and a strand of highly conductive resin coated material;
    a two-piece flanged case disposed between a pair of spokes of said drum and into which case said cable extends;
    an electronic circuit and an electrometric gage inside of said case interconnected to said strand of highly conductive material and said plural strands of load bearing material;
    a calibrated counter drivably connected to said cable and operable as said is extended and retracted; and
    a thermistor adjacent the outer terminal end of the said cable and electrically connected to said circuit by connection to said highly conductive strand and to said plural load bearing strands.

3. A downrigger reel and temperature indicator comprising:
- a rod supported drum, said drum having spokes;
- a coated cable on said drum, said cable comprising plural strands of load bearing material and one coated strand of a highly conductive metal;
- a counter over which said cable passes;
- a flanged gage case and battery support enclosure including an electronic circuit powered by a battery in said case in accord with the closure of a switch in said circuit, and said circuit directly connected to said load bearing cable and to said conductive metal strand; and
- a thermal sensor element operably connected to said highly conductive strand of metal and to said load bearing strands of metal at the end opposite from connection to said electronic circuit.

4. The downrigger reel and temperature indicator of claim 3 where said load bearing strands are stainless steel and said highly conductive and insulated strand is a copper alloy.

5. The downrigger reel and temperature indicator of claim 3 wherein said load bearing strands of cable extend beyond said sensor and return to said sensor thus forming a connecting loop below said sensor.

6. In the downrigger structure of claim 3 wherein said sensor is fully encapsulated by a potting resin and said load bearing strands for a connecting loop which depends therebelow.

7. An improved temperature sensing and depth indicating downrigger reel comprising:
- a rod supported drum;
- a plurality of spokes on said drum;
- a two-piece flanged case between two of said spokes and said flange of said case bearing against said spokes on both sides thereof;
- a gage inside said case and visible from one side of said drum;
- an electronic circuit within said case and connected to said gage;
- a battery in said case and operably connected to said circuit, said battery accessible through said case;
- a switch normally interrupting said circuit and selectively closed from outside said case;
- a cable having plural load bearing strands and a coated highly conductive strand in an outer protective resin wrapper and having one end connected to said electronic circuit and the other end extendable from said drum;
- a thermistor operably connected at said other end of said cable and said load bearing strands of said cable forming an eye below said sensor;
- a wedge-like friction brake selectively pivotal into braking relation between flanges of said drum;
- a calibrated counter activated by withdrawal of said cable from said drum;
- a swivel support for said counter; and
- a sheave depending from said swivel in a plane substantially and normally parallel to the plane of said drum and said cable passing over said sheave and fed from beneath said drum.

8. In the combination of claim 7 in which a socket connector orients a rod-like frame in support of said drum and said brake pivotally depends from said socket connector for tilting toward and away from frictional engagement between the flanges of said drum.

9. In the combination of claim 7 where said drum and said sheave are fabricated from a tough corrosion resistant resin.

* * * * *

UNITED STATES PATENT OFFICE
CERTIFICATE OF CORRECTION

Patent No. 4,050,180     Dated 1977 September 27

Inventor(s) Jack C. King

It is certified that error appears in the above-identified patent and that said Letters Patent are hereby corrected as shown below:

Column 2, line 20, change "readout" to read -- read-out --

Column 2, line 56, change "termp-" to read -- temp- --

Column 2, line 57, change "readout" to read -- read-out --

Column 3, line 16, change "incudes" to read -- includes --

Column 3, line 48, change "rodarms" to read -- rod-arms --

Column 4, line 66, change "gate" to read -- gage --

Column 6, line 13, after "around" insert -- the --

Column 7, line 12, after "bearing" insert -- members --

Column 8, line 64 (Claim 2), after "said" insert -- cable --

Column 8, line 65 (Claim 2), after "of" delete -- the --

Signed and Sealed this

Third Day of January 1978

[SEAL]

Attest:

RUTH C. MASON
*Attesting Officer*

LUTRELLE F. PARKER
*Acting Commissioner of Patents and Trademarks*